United States Patent
Kelly et al.

(10) Patent No.: US 9,427,008 B2
(45) Date of Patent: Aug. 30, 2016

(54) METHOD OF MYCELIATION OF AGRICULTURAL SUBSTATES FOR PRODUCING FUNCTIONAL FOODS AND NUTRACEUTICALS

(71) Applicant: Mycotechnology, Inc., Aurora, CO (US)

(72) Inventors: Brooks John Kelly, Denver, CO (US); James Patrick Langan, Denver, CO (US)

(73) Assignee: MYCOTECHNOLOGY, INC., Aurora, CO (US)

( * ) Notice: Subject to any disclaimer, the term of this patent is extended or adjusted under 35 U.S.C. 154(b) by 0 days.

(21) Appl. No.: 13/859,719

(22) Filed: Apr. 9, 2013

(65) Prior Publication Data

US 2014/0065263 A1 Mar. 6, 2014

Related U.S. Application Data

(60) Provisional application No. 61/697,506, filed on Sep. 6, 2012, provisional application No. 61/802,256, filed on Mar. 15, 2013.

(51) Int. Cl.
| | |
|---|---|
| *A23L 1/28* | (2006.01) |
| *A23L 1/30* | (2006.01) |
| *A23G 1/42* | (2006.01) |
| *A23G 1/30* | (2006.01) |

(52) U.S. Cl.
CPC .. *A23L 1/28* (2013.01); *A23L 1/30* (2013.01); *A23G 1/30* (2013.01); *A23G 1/42* (2013.01); *A23G 1/423* (2013.01)

(58) Field of Classification Search
CPC ........... A23L 1/28; A23G 1/42; A23G 1/423
See application file for complete search history.

(56) References Cited

U.S. PATENT DOCUMENTS

| 1,822,227 A | 9/1931 | Lendrich et al. |
| 2,693,664 A | 8/1949 | Szuecs |

(Continued)

FOREIGN PATENT DOCUMENTS

| CN | 102860541 A | 1/2013 |
| EP | 1173544 | 1/2002 |

(Continued)

OTHER PUBLICATIONS

Taylor, J. (2001) "Measuring Fungal Growth." Chapter 3.8 In: Microorganisms and Biotechnology, 2nd ed., Thomas Nelson, Ltd. 2001 Delta Place, Cheltenham, U. K. (ISBN 0 17 448255 8). Specif. p. 4 (book p. 44).

(Continued)

*Primary Examiner* — Felicia King
(74) *Attorney, Agent, or Firm* — Swanson & Bratschun, L.L.C.

(57) ABSTRACT

The present invention relates to a method of myceliation of agricultural substrates for producing functional foods with health benefits, wherein the method comprises of inoculating an agricultural substrate with one or more species of pure fungal culture comprising Basidiomycota and Ascomycota derived from liquid state fermentation, enabling mycelial growth on the agricultural substrate by controlling growth conditions and harvesting of a myceliated agricultural product after the mycelial growth reaches a desired stage. The present invention further provides a myceliated agricultural product enriched with nutrients, processed into a nutraceutical or functional food for human consumption.

9 Claims, 2 Drawing Sheets

(56) References Cited

U.S. PATENT DOCUMENTS

| | | | |
|---|---|---|---|
| 3,749,584 | A | 7/1973 | Kurtzman et al. |
| 4,891,220 | A | 1/1990 | Donzis |
| 5,934,012 | A * | 8/1999 | Holtz et al. ............... 47/1.1 |
| 6,045,834 | A | 4/2000 | Howes et al. |
| 6,277,396 | B1 | 8/2001 | Dente |
| 6,476,003 | B1 | 11/2002 | Jordan et al. |
| 6,490,824 | B1 | 12/2002 | Intabon et al. |
| 6,558,943 | B1 | 5/2003 | Li et al. |
| 6,569,475 | B2 | 5/2003 | Song et al. |
| 2,419,515 | A1 | 8/2011 | Yan et al. |
| 9,068,171 | B2 | 6/2015 | Kelly et al. |
| 2002/0137155 | A1 | 9/2002 | Wasser et al. |
| 2003/0208796 | A1 | 11/2003 | Song et al. |
| 2004/0009143 | A1 | 1/2004 | Golz-Berner et al. |
| 2004/0035047 | A1 | 2/2004 | Hwang et al. |
| 2004/0211721 | A1 | 10/2004 | Stamets |
| 2005/0180989 | A1 | 8/2005 | Matsunaga |
| 2005/0255126 | A1 | 11/2005 | Tsubaki et al. |
| 2006/0134294 | A1 | 6/2006 | McKee et al. |
| 2006/0280753 | A1 | 12/2006 | McNeary |
| 2007/0160726 | A1 | 7/2007 | Fujii |
| 2008/0031892 | A1 * | 2/2008 | Kristiansen ............. 424/195.15 |
| 2008/0057162 | A1 | 3/2008 | Brucker et al. |
| 2008/0107783 | A1 * | 5/2008 | Anijs et al. ................ 426/270 |
| 2008/0171104 | A1 | 7/2008 | Zhu |
| 2008/0193595 | A1 * | 8/2008 | De Vuyst et al. ............. 426/45 |
| 2008/0264858 | A1 | 10/2008 | Stamets |
| 2008/0274234 | A1 | 11/2008 | Miller |
| 2008/0296223 | A1 | 12/2008 | Hiromoto |
| 2008/0299645 | A1 | 12/2008 | Cleaver et al. |
| 2009/0047237 | A1 | 2/2009 | Stamets |
| 2009/0053363 | A1 | 2/2009 | An |
| 2009/0098244 | A1 | 4/2009 | Schatzmayr et al. |
| 2009/0104310 | A1 | 4/2009 | Nakajima |
| 2009/0130138 | A1 | 5/2009 | Stamets |
| 2009/0220645 | A1 | 9/2009 | Martinez |
| 2009/0280212 | A1 | 11/2009 | Sugimoto et al. |
| 2010/0055241 | A1 | 3/2010 | Nakano et al. |
| 2010/0183765 | A1 | 7/2010 | Laan Van Der et al. |
| 2010/0203189 | A1 | 8/2010 | Holliday |
| 2010/0203194 | A1 | 8/2010 | Salminen et al. |
| 2010/0221385 | A1 | 9/2010 | Matsui et al. |
| 2010/0239711 | A1 | 9/2010 | Li |
| 2010/0266726 | A1 | 10/2010 | Ogura et al. |
| 2010/0316763 | A1 | 12/2010 | Choi et al. |
| 2011/0008384 | A1 | 1/2011 | Stamets |
| 2011/0052758 | A1 | 3/2011 | Greiner-Stoeffele et al. |
| 2011/0070332 | A1 | 3/2011 | Bernaert et al. |
| 2011/0081448 | A1 | 4/2011 | Dunphy et al. |
| 2011/0091579 | A1 | 4/2011 | Hausman |
| 2011/0123675 | A1 | 5/2011 | Bernaert et al. |
| 2011/0189220 | A1 | 8/2011 | Yang |
| 2011/0200551 | A1 | 8/2011 | Stamets |
| 2011/0206721 | A1 | 8/2011 | Nair |
| 2011/0229616 | A1 | 9/2011 | Anijs et al. |
| 2011/0262593 | A1 | 10/2011 | Binggeli et al. |
| 2011/0268980 | A1 | 11/2011 | Kalisz et al. |
| 2012/0017781 | A1 | 1/2012 | Ceccarelli |
| 2012/0027889 | A1 | 2/2012 | Portella |
| 2012/0034344 | A1 | 2/2012 | Menon et al. |
| 2012/0082754 | A1 | 4/2012 | Holliday |
| 2012/0100249 | A1 | 4/2012 | Laan et al. |
| 2012/0128823 | A1 | 5/2012 | Camu |
| 2012/0171308 | A1 | 7/2012 | Da Luz Moreira et al. |
| 2012/0231114 | A1 | 9/2012 | Bezerra De Oliveira et al. |
| 2012/0244254 | A1 | 9/2012 | Takahashi |
| 2012/0321744 | A1 | 12/2012 | Chhun et al. |
| 2013/0209608 | A1 | 8/2013 | Berends et al. |
| 2013/0209609 | A1 | 8/2013 | Moreno et al. |
| 2013/0337114 | A1 | 12/2013 | Binggeli et al. |
| 2014/0105928 | A1 | 4/2014 | Stamets |
| 2014/0170264 | A1 | 6/2014 | Kelly et al. |
| 2014/0302560 | A1 | 10/2014 | Kelly |
| 2015/0257405 | A1 | 9/2015 | Kelly et al. |
| 2015/0257406 | A1 | 9/2015 | Kelly et al. |
| 2015/0272155 | A1 | 10/2015 | Kelly et al. |

FOREIGN PATENT DOCUMENTS

| | | |
|---|---|---|
| EP | 2474221 | 2/2011 |
| JP | 2005/0027540 | 2/2005 |
| KR | 1487724 B1 | 2/2015 |
| WO | WO 01/32830 | 5/2001 |
| WO | WO 2006/107208 | 10/2006 |
| WO | WO 2011/032244 | 3/2011 |
| WO | WO 2011/151831 | 12/2011 |
| WO | WO 2013/171194 | 11/2013 |
| WO | WO 2014/145256 A1 | 9/2014 |
| WO | WO 2014/145265 A2 | 9/2014 |

OTHER PUBLICATIONS

International Search Report and the Written Opinion of the International Searching Authority, or the Declaration for PCT/US14/29989 dated Aug. 12, 2014.

International Search Report and the Written Opinion of the International Searching Authority, or the Declaration for PCT/US14/29998 dated Sep. 11, 2014.

Autoclave Search (2014) www.meriam-webster.com/medlineplus/autoclave.

Berovic et al. (2003) J. Biotechnol. 103(1): 77-86.

Bok et al. Phytochemistry (1999) 51: 891-898.

"Can You Eat Mycelium?" (2014) wiki.answers.com.

"Eat Mycelium cakes?" (2014) Mycotopia.net.

"Eat Mycelium?" (2014) fungifun.com.

"Eating mycelium to trip" (2014) shroomery.org.

"Eating Mycelium?" (2014) zoklet.net.

"Eating Mycelium" (2014) wisegeek.com Conjecture Corporation.

Encyclopedia Britannica. Louis Pasteur. Datasheet [online]. Copyright 2014 Encyclopedia Britannica, Inc. [retrieved on Feb. 6, 2014]. Retrieved from the Internet: <URL: http://www.britannica.com/EBchecked/topic/445964/Louis-Pasteur>. specif, p. 3.

English translation.deOliveira, B. et al. WO 2011/032244 A1 .Flours produced from fungus myceliated grain.Published Mar. 24, 2011 .pp. 1-24. specif, pp. 2, 6-7.

Firenzuoli et al. (2008) Evid. Based Complement Alternat. Med. 5(1): 3-15.

Foster (2014) "What is Mycelium?" wisegeek.com. Conjecture Corporation.

Han (2005) Solid-state fermentation of cornmeal with the basidiomycete Ganoderma lucidum for degrading starch and upgrading nutritional value J. Appl. Micro. 2005, 99: 910-915.

Hashim, Puziah (1997) Effect of Processing on Flavour Precursors, Pyrazines and Flavour Quality of Malaysian Cocoa Beans. PhD thesis, Universiti Pertanian Malaysia.

Ikrawan, Yusep (2003) Influence of Carboxypeptidases on Cocoa Specific Aroma Precursors and Methylpyrazines in Under-Fermented Cocoa Beans. PhD thesis, Universiti Putra Malaysia.

Ishikawa et al. (2001) J. Nat. Prod. 64(7): 932-934.

Kang (2005) Zhongguo Zhong Yao Za Zhi 30(30): 193-195, Abstract.

Kang (2003) Zhongguo Zhong Yao Za Zhi 28(11): 1038-1040, Abstract.

Konno et al. (2002) International Journal of Medicinal Mushrooms 4(3): 10-21.

Kuo et al. (1996) Am. J. Chin. Med. (1996) 24: 111-125.

Lakshmi et al. Teratog. Carcinog. Mutagen (2003) 1: 85-97.

Lee et al. (2003) Enzyme and Microbial Technology 32(5): 574-581.

Liu et al. (2012) Molecules, 17:12575-12586, "Improving the Fermentation Production of the Individual Key Triterpene Ganoderic Acid Me by the Medicinal Fungus *Ganoderma lucidum* in Submerged Culture."

McMahon (2014) "How Can I Make Tempeh?" wisegeek.com Conjecture Corporation.

(56) References Cited

OTHER PUBLICATIONS

MicrobiologyBytes. Introduction to Mycology. Datasheet [online]. Updated Apr. 8, 2009 [retrieved on Feb. 6, 2014]. Retrieved from the Internet: <URL: http://www.microbiologybytes.com/introduction/mycl.html>. specif, p. 8.
Mohamed Ali, Aisha Bibi (2010) Production of pyrazine flavours by mycelial fungi. Master's thesis, Universiy of Pretoria.
Morris et al. (2003) Micologia Aplicada Internacional 15(1): 7-13, Abstract.
Office Action dated Feb. 19, 2014 for U.S. Appl. No. 13/844,685.
Paterson (2006) Phytochemistry 67:1985-2001.
Rodrigues de Melo et al. (2009) Mycoscience 50(1): 78-81.
Russell, R. et al. 2006. Ganoderma—a therapeutic fungal biofactory. Phytochemistry 67:1985-2001. specif, pp. 1985, 1987-1988, 1994-1995, 1997-1998.
Shao et al. (2001) Electrophoresis 22(1): 144-150.
Stamets (2003) Chapter 12, pp. 89-92 "Culturing Mushroom Mycelium on Agar Media."
Ulziijargal et al. (2011) Int. J. Med. Mushrooms 13(4): 343-349, Abstract.
Wasser (2002) Appl Microbiol Biotechnol 60: 258-274.
Willis, W.L. et al. (2010) Effect of Dietary Fungus Myceliated Grain on Broiler Performance and Enteric Colonization with Bifidobacteria and *Salmonella International Journal of Poultry Science.*, 9(1): 48-52.
Wu et al. (2011) Carcinogenesis 32(12): 1890-1896.
Yin et al. (2010) Am. J. Chin. Med. 38(1): 191-204.
Zhang et al. (2010) Journal of Medicinal Plants Research 4(18): 1847-1852.
Zhang et al. (2004) Life Sciences, 75:2911-2919, "Induction of HL-60 apoptosis by ethyl acetate of *Cordyceps sinensis* fungal mycelium."
Zhou et al. (2009) Journal of Pharmacy and Pharmacology 61:279-291.
Chang et al. (2009) "Gandoderma lucidum Extract Promotes Immune Responses in Normal BALB/c Mice In Vivo", in vivo, V. 23: 755-760.
Sone et al. (1985) "Structures and Antitumor Activities of the Polysaccharides Isolated from Fruiting Body and the Growing Culture of Mycelium of Ganoderma lucidum", Agric. Biol. Chem., V. 49(9): 2641-2653.
Zhong et al. (2004) "Submerged Cultivation of Medicinal Mushrooms for Production of Valuable Bioactive Metabolites", Adv Biochem Engin/Biotechnol V. 87: 25-59.
Emden (2015) "Decaffeination 101: Four Ways to Decaffeinate Coffee" Coffee Connection; retrieved from: http://www.coffeeconfidential.org/health/decaffeination/ Jan. 29, 2015. 7 pages.
Tsubouchi et al. (1987) "Effect of roasting on ochratoxin A level in green coffee beans inoculated with Aspergillus ochraceus", Mycopathologia 97: 111-115.
He, Jianwei et al. (2010) "Patented Techniques for Detoxification of Mycotoxins in Feeds and Food Matrices" Recent Patents on Food, Nutrition & Agriculture, vol. 2:96-104.
International Preliminary Report on Patentability for PCT/US2014/029989 dated Sep. 15, 2015, 9 pages.
International Preliminary Report on Patentability for PCT/US2014/029998 dated Sep. 15, 2015, 8 pages.
International Search Report and Written Opinion for PCT/US15/47036 dated Jan. 29, 2016, 16 pages.
Kamimura, Hisashi (1989) "Removal of Mycotoxins during Food Processing" Tokyo Metropolitan Research Laboratory of Public Health article: 88-94.
"Technique Sheet: Culture Media for Fungi" Retrieved from www.centralpamushroomclub.org/sites/default/files/culture.pdf (accessed Feb. 12, 2015).

\* cited by examiner

METHOD OF MYCELIATION OF AGRICULTURAL SUBSTATES FOR PRODUCING FUNCTIONAL FOODS AND NUTRACEUTICALS

RELATED APPLICATIONS

This patent application claims the benefit of U.S. Provisional Patent Application No. 61/697,506, filed 6 Sep. 2012, and U.S. Provisional Patent Application No. 61/802,256, filed 15 Mar. 2013.

FIELD OF THE INVENTION

The present invention pertains to a method of liquid state and solid state myceliation of agricultural substrates in order to produce functional foods with enhanced nutrition profile and health benefits.

BACKGROUND OF THE INVENTION

Foods and food supplements such as dietary supplements, functional foods and medical foods offer an affordable solution for preventing diseases in addition to offering health promoting and health maintaining effects. Use of natural edible and medicinal mushrooms as traditional medicine by different ethnic groups especially by a majority of population from Eastern countries is known from historic evidences.

Functional foods are generally similar to conventional foods that are consumed as part of a usual diet, which in addition to basic nutrition functions, possess bioactive compounds that offer physiological benefits such as reducing risk of chronic disease. The role of beneficial microorganisms, especially fungi, in the formation of fermentation foods is paramount and fermented foods such as yoghurt, red rice, cheese, wine, fermented beverages among such other food products are a part of daily diet for people in different cultures. Fermented foods, unlike non-fermented foods, have a longer shelf-life, improved quality and nutritional value thereby making fermentation a key factor in the preservation of such foods.

Fungi are metabolically similar to animals but structurally similar to plants, wherein fungi possess a rigid cell wall formed largely of long sugar molecule chains joined by complex, difficult to digest beta (β-) linkages and to a smaller extent more easily digestible alpha (α-) linkages in conjunction with membrane-bound proteins. In contrast, plant cell walls are made of cellulose polysaccharides comprising 1-4 glycosidic linkages, which are difficult to digest by human digestive enzymes. However, as fungal cell walls are primarily composed of 1-3 glycosidic linkages, with 1-6 linked side chains, their cell walls can be processed into smaller, more easily digestible and immunologically-active polysaccharide molecules with variable microparticle size called b-glucans, and related glycoprotein compounds.

Mycelia are produced by fungi and are composed of tubular, filamentous hyphal structures that facilitate collection of water and nutrients thereby enabling growth of the fruiting bodies or mushrooms. Mycelium has been used as a primary source for medicinal extracts and animal food, while the fruiting bodies or mushrooms, which normally take a longer duration to develop, are generally used as human food.

There exist numerous studies showing various beneficial effects of metabolites produced by medicinal and edible fungal species. Such species of beneficial fungi are selected based on their unique cell wall polysaccharides and their ability to produce desired quantity of specific metabolites by utilizing complex substrates. Metabolites from more than 650 mushroom species are known to have anti-tumor and immunomodulatory effects on humans.

It is known from the prior art that mycelial structures and metabolites of beneficial fungal species possess enhanced biological activity and numerous therapeutic properties. For instance, *Agaricus blazei* is referenced to produce unique alpha and beta-linked glucans called glucomannan and riboglucan, which are known anti-viral compounds. *A. blazei* polysaccharide extracts have been shown to have anti-cancer activity.

*Cordyceps sinensis* produces cordycepic acid, adenosine, D-mannitol, and cordycepinadenosine, which act as an immunomodulating agent and also shows anti-viral activity. *C. Sinensis* extracts have been shown to be exhibiting anti-aging and aphrodisiacal activity. Mycelial sterols isolated from *C. sinensis* have been shown to inhibit the proliferation of numerous cancer cell lines. *C. sinensis* mycelial polysaccharide extracts have been shown to induce hypoglycemia.

Mycelial structures of *Flammulina velutipes* comprise of a polysaccharide profile that shows immunomodulating activity. *F. velutipes* mycelium also comprises of a unique ergosterol, amino acid profile along with sterpuric acid, mannitol, ribitol, and nucleosides such as guanosine and adenosine. In addition, Enokipodins A-D extracted from *F. Velutipes* mycelium are broad spectrum antimicrobial terpenes. Proteins flammulin and velutin exhibit anti-HIV and anti-HPV activity.

Polysaccharide profile of *Ganoderma lucidum* has been shown to be immunomodulating in human cell lines. *G. Lucidum* mycelial extracts have anti-peroxidative, anti-inflammatory, and anti-mutagenic properties. Furthermore, *G. Lucidum* extracts possess anti-aging and aphrodisiacal properties. Triterpenoid profile of *G. Lucidum* has been determined and shown to be anti-hepatotoxic and hepatoprotective, anti-tumor, anti-angiogenic, anti-hypertensive, hypocholesterolemic and anti-histaminic activity. In addition to polysaccharides and glycoproteins, *G. Lucidum* also produces triterpenes, such as ganoderic and lucidenic acids, phenolic compounds, and sterols with high biological activity and therapeutic properties such as anti-oxidant, anti-tumor, anti-bacterial, anti-cancer, anti-inflammatory, anti-histamine, hypotensive, and sedative properties.

*Grifola frondosa* polysaccharide profile has been shown to have immunomodulating and anti-oxidative activity. *G. Frondosa* produces ergosterols and an anti-oxidative profile of fatty acids. Anti-tumor effects of *G. Frondosa* extracts on in vitro cancer cell lines have also been studied extensively.

*Hericium erinaceus* mycelial structure and fruiting body extracts show anti-mutagenic and immunomodulatory activities across various cell lines. *H. erinaceus* produces hericenones in fruit bodies and erinacines in mycelium, hericenones and erinacines are structurally determined compounds that can pass through the blood-brain barrier and promote secretion of Nerve Growth Factor (NGF) in selective regions of the brain. Erinacenes have been shown to be greater potentiators of NGF expression than hericenones.

*Lentinula edodes* polysaccharide profile shows immunomodulating and antiviral activity. Lentinan and other metabolites have been studied for their numerous health care benefits. In some countries, lentinan is classified as an "antineoplastic polysaccharide" and is available for clinical use. Addition of lentinan to standard cancer therapies has been shown to result in increased tumor necrosis and with hepatocellular carcinoma and improved quality of life in patients with esophageal carcinoma.

*Phellenis linteus* extracts have been shown to exhibit anti-tumor activity. Similarly, *Polyporus umbellatus* polysaccharide extracts have been studied and shown to possess anti-cancer, immunomodulating, anti-malarial, and hepatoprotective properties. *Inonotus obliquus* mycelial polysaccharide extract demonstrated anti-tumor, hypoglycemic, and anti-oxidative properties.

*Pleurotus ostreatus* mycelium and fruit body have been shown to be very similar in composition, differing only in its amino acid content. The mycelial polysaccharide profile consists primarily of laminarin, the extract of which has been shown to exhibit immunomodulating activity. Lovastatin, isolated from the mycelial broth of *P. ostreatus* exhibits anti-carcinoma activity, inhibits growth of harmful bacteria, fungi, and also helps in lowering of cholesterol level.

*Trametes versicolor* produces Heteroglucans with alpha (1-4) and beta (1-3) glycosidic linkages with fuctose in PSK (Krestin) and rhamnose, arabinose in PSP and has been shown to exhibit anti-tumor and immunomodulatory activity. PSK, an approved drug paid for by national health care in Japan, is a mycelial extract which exhibits immunomodulating, anti-viral, and cholesterol regulating properties.

Mycelial polysachharide extracts of *Tremella fuciformis* have been shown to be therapeutic for various circulatory disorders, neurological disorders and also exhibits anti-carcinoma, anti-tumor, and anti-aging properties. Similarly *G. lucidum* produces a protein called LZ-8 which shows immunomodulating and anti-tumor properties.

Myceliation of agricultural materials have been known in the art for providing nutrition enhanced food products for human consumption and for producing animal feedstuff. For example, US Patent Publication US20120082754 discloses use of myceliated grain and other myceliated agricultural materials as animal food supplement; US Patent Publication US20100239711 discloses a method of manufacturing coffee by solid state fermentation using fungal species belonging to Eumycota; US Patent Publication US20120231114 discloses a method for producing flours from grain myceliated with macroscopic fungi; US Patent Publication US20080171104 discloses production of health promoting dairy and food products containing mushroom glucan through fermentation of *Grifola Frondosa*; US Patent Publication US20050180989 discloses treating of hyperlipidemia by use of an anti-hyperlipidemic agent and food.

The present invention exploits the use of mycelial tissues instead of fruiting bodies of a variety of medicinal and edible mushroom species, which might take a longer duration for developing into fruiting bodies. There is a need in the art to have a new and better method of myceliation that is suitable for myceliation of a variety of agricultural substrates comprising seeds, grains, cereals, dry fruits, herbs, spices, non-legume beans among such other agricultural materials in order to produce functional foods from basic food products. Furthermore, such new method should employ more efficient inoculation and fermentation technologies that optimize utilization of interstitial space in and between items of substrate. Furthermore, such new method should employ a zero-waste philosophy in combination with new methods for producing functional foods and nutraceutical formulations, which may be used directly, stored for later use, packaged, or shipped.

Thus, the present invention satisfies the unmet needs and overcomes the deficiencies prevalent in the art by developing a new method of myceliation using efficient inoculation and fermentation technologies of a variety of agricultural substrates for producing functional foods with health benefits suitable for human consumption.

SUMMARY OF THE INVENTION

The present invention pertains to methods of liquid state and solid state myceliation of agricultural substrates, involving efficient inoculation and fermentation in order to produce functional foods with enhanced nutrition profile and health benefits.

In one aspect, the present invention pertains to a method of liquid state myceliation of agricultural substrates for producing functional foods for human consumption, wherein the method comprises the steps of:
a. inoculating an agricultural substrate with an aliquot of fungal culture selected from a group consisting of Basidiomycota and Ascomycota derived from liquid state fermentation;
b. enabling mycelial growth by providing optimum growth conditions to obtain a myceliated substrate;
c. harvesting the myceliated substrate along with metabolized contents of the agricultural substrate after the mycelia growth reaches a desired stage; and
d. processing the myceliated substrate for use as a functional food.

In one aspect, method of myceliation further comprises addition of at least one small molecule compound selected from one or more of citric acid, ascorbic acid, honey, cane sugar, grape fruit essential oil, citrus essential oil, ethyl alcohol, and combinations thereof.

In one aspect, the present invention provides a method of myceliation using pure strains of fungal culture selected from the group consisting of *Hericium erinaceus, Tremella fuciformis, Agaricus blazei, Cordyceps sinensis, Flammulina velutipes, Ganoderma lucidum, Grifola frondosa, Letinula edodes, Phellenis linteus, Polyporus umbellatus, Inonotus obliquus, Pleurotus ostreatus, P. eryngii, P. citrinopileatus, P. djamor, Trametes versicolor, Volvariella volvacea, Hypsizygus marmoreus, Pholiota nameko, Tuber melanosporum, Moschella hortensis*, and combinations thereof.

In another aspect, the present invention provides a method of solid state myceliation of agricultural substrates for producing functional foods for human consumption, wherein the method comprises the steps of:
a. inoculating an agricultural substrate in a solid growth media with an aliquot of fungal culture selected from a group consisting of Basidiomycota and Ascomycota derived from liquid fermentation;
b. enabling mycelial growth by providing optimum growth conditions to obtain myceliated substrate;
c. harvesting myceliated substrate along with metabolized contents of the agricultural substrate after the mycelia growth reaches a desired stage; and
d. processing the myceliated substrate for use as a functional food.

In a further aspect, the present invention also provides a myceliated agricultural product for human consumption as a nutraceutical or functional food with health benefits comprising a myceliated agricultural substrate, wherein an agricultural substrate is myceliated by inoculating the agricultural substrate with a liquid media comprising an aliquot of pure strain of a fungal culture selected from the group consisting of Basidiomycota and Ascomycota derived from liquid state fermentation, further wherein the liquid state fermentation yields a fungal culture morphology comprising spherical conglomerations of the fungal culture that are sized to interstitially penetrate the substrate to optimize inoculation of the substrate.

DETAILED DESCRIPTION OF THE INVENTION

Figure 1:
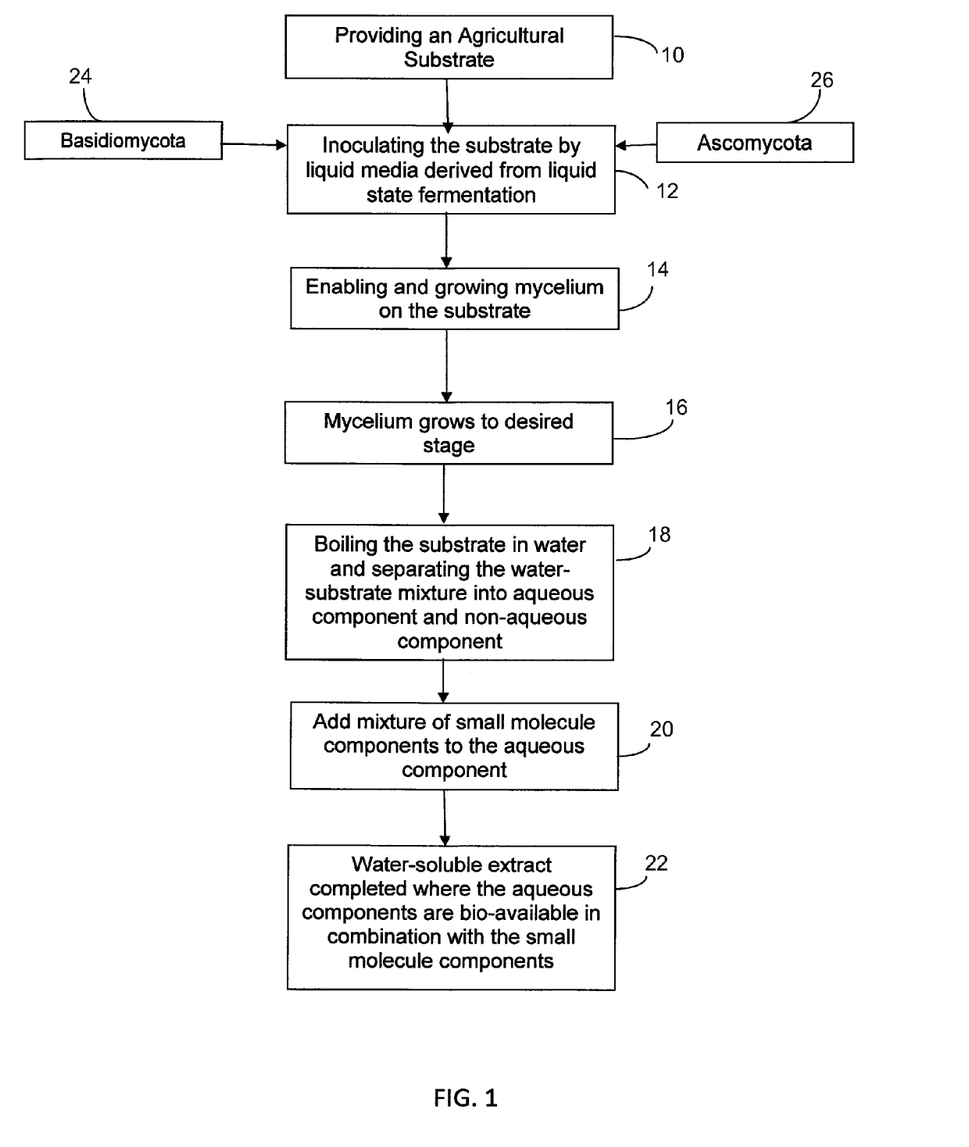
FIG. 1 is a flowchart of a method of myceliation of agricultural substrates using fungal cultures selected from Basidiomycota and Ascomycota.

FIG. 1 shows a flow chart of a method of liquid state myceliation of agricultural substrate for producing functional foods for human consumption comprises the steps of:
step 10 provides an agricultural substrate;
step 12 involves optional pre-processing of the substrate based on nature of the substrate;
step 14 involves inoculation of the substrate with a liquid media comprising an aliquot of culture derived from a liquid state fermentation, wherein the culture is selected from Basidiomycota and Ascomycota 14a, 14b respectively;
step 16 enables mycelium growth on the substrate under optimum growth conditions;
step 18 shows the mycelial growth on the substrate reaching a desired stage;
step 20 involves harvesting of myceliated substrate along with metabolized contents; and
step 22 involves processing of the myceliated substrate for use as a nutraceutical or functional food.

Figure 2:
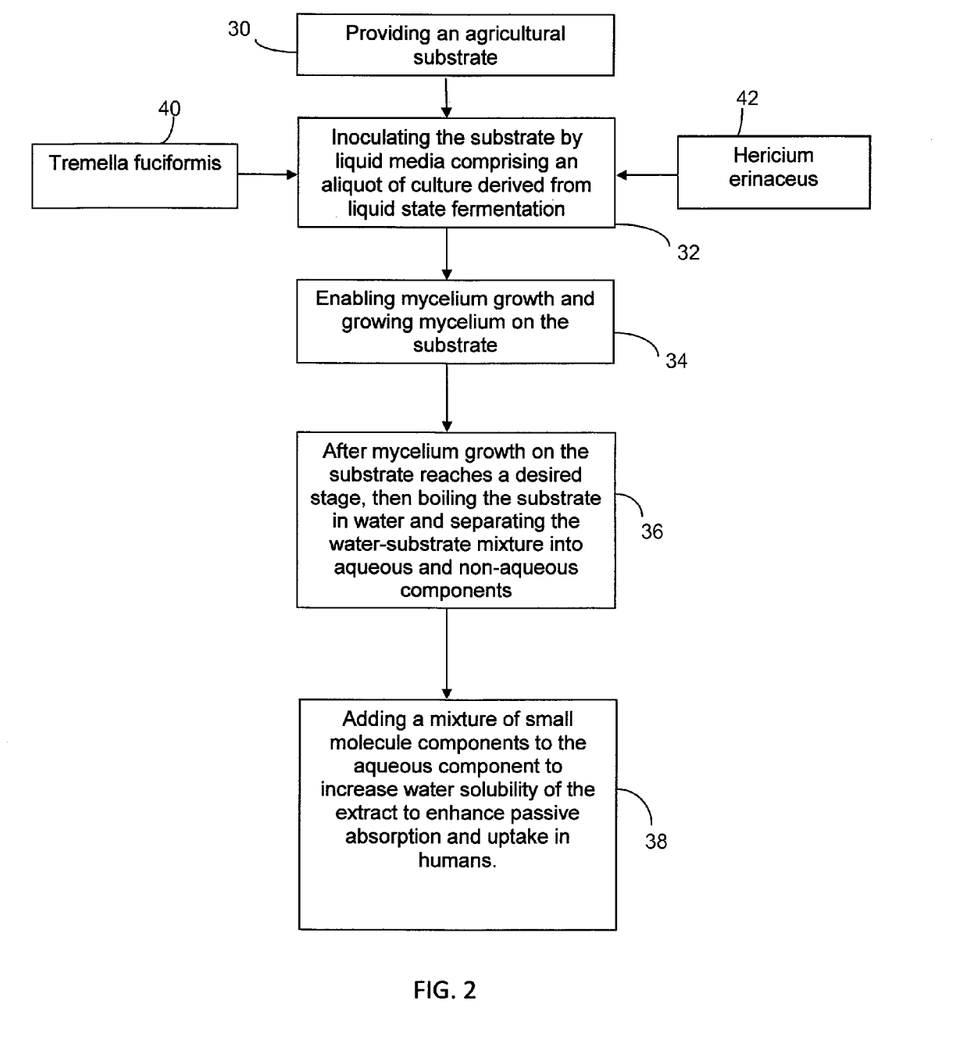
FIG. 2 is a flowchart of a method of myceliation of agricultural substrate for producing functional foods.

In an embodiment, present invention provides a method of liquid state myceliation of an agricultural substrate for producing functional foods. The method of liquid state myceliation comprises the following steps as shown in FIG. 2:
step 30 provides an agricultural substrate;
step 32 involves pre-processing of the substrate based on nature of the substrate;
step 34 inoculates the substrate with liquid media comprising fungal culture selected from the group consisting of *Tremella fuciformis* and *Hericium erinaceus;*
step 36 enables mycelium growth on the substrate under optimum growth conditions;
step 38 shows mycelial growth reaching a desired growth stage;
step 40 harvests myceliated substrate along with metabolized contents;
step 42 optionally adds at least one small molecule compound to increase water solubility and passive absorption upon consumption; and
step 44 involves processing of the myceliated substrate for use as a nutraceutical or functional food.

In an embodiment, present invention provides a method of solid state myceliation of an agricultural substrate for producing functional food by inoculating the agricultural substrate with pure strains of fungal culture selected from a group consisting of Basidiomycota and Ascomycota.

In an embodiment, small molecule is selected from a group consisting of citric acid, ascorbic acid, honey, cane sugar, grape fruit essential oil, citrus essential oil, ethyl alcohol and combinations thereof, wherein addition of the small molecule component promotes water solubility and bioavailability of the myceliated substrate. In particular, the small molecule component improves passive absorption through mucous membranes in the mouth, throat, stomach and small intestine.

In an embodiment, pure strains of fungal culture are selected from a group consisting of *Hericium erinaceus, Tremella fuciformis, Agaricus blazei, Cordyceps sinensis, Flammulina velutipes, Ganoderma lucidum, Grifola frondosa, Letinula edodes, Phellenis linteus, Polyporus umbellatus, Inonotus obliquus, Pleurotus ostreatus, P. eryngii, P. citrinopileatus, P. djamor, Trametes versicolor, Volvariella volvacea, Hypsizygus marmoreus, Pholiota nameko, Tuber melanosporum, Moschella hortensis*, and combinations thereof.

In an embodiment, agricultural substrate is selected from a group consisting of one or more of grains, cereals, seeds, non-legume beans, tubers, citrus fruits, berries, dry fruits, spices, herbs and vegetables.

Agricultural substrates of the present invention can be pre-processed before inoculation. Pre-processing depends on the nature of substrate and can include:
a. heat treatment comprising pasteurization, heat sterilization and filtration; and/or
b. at least partial coating of a surface of substrate with at least one myceliation enhancing compound selected from a vegetable oil such as olive oil; and/or
c. at least partial coating of a surface of substrate with at least one substance known to exhibit neuroregenerative and neuroprotective properties such as lecithin.

In an embodiment, a step of pre-processing comprises heat treatment based on nature of the substrate in order to eradicate or minimize microbial load present on its surface. For example, agricultural substrates such as grains, cereals, and seeds prior to inoculation with pure culture of fungal species are subjected to heat sterilization treatment comprising pressure cooking for 90 minutes at 15 lb/inch square in order to remove microbial content present on the substrate without adversely affecting its taste and nutritional quality.

In another embodiment, heat treatment under pre-processing step comprises of pasteurization. For example, agricultural substrates such as herbs, spices, dry fruits, vanilla beans, coffee beans are pasteurized by placing in glass jars or plastic growth bags and subjected to dry heat treatment at 145 degrees F. to 195 degrees F. for 30 to 90 minutes in covered stainless steel trays.

In an embodiment, pre-processing can also comprise filtration of a substrate in liquid form. For example, substrate such as aqueous solution of any substrate can be subjected to filtration in order to remove microbial content prior to inoculation with pure culture of fungal species.

In accordance with the present invention, when an agricultural substrate has substrate elements defining interstitial spaces in between, such as in rice, the substrate can be pre-processed before inoculation by at least partially coating a surface of the substrate with at least one myceliation enhancing compound such as an anti-caking agent. For food-quality products, the anti-caking agent is edible, for example vegetable oil such as olive oil can be used to coat the substrate. Vegetable oil can increase the interstitial spaces between substrate elements to improve myceliation. Preferably, the vegetable oil can is olive oil, which may have neuro-protectant properties and olive oil is beneficial for human consumption by lowering the gylcemic index of the substrate. Further, the substrate can also be coated with at least one substance known to exhibit neuroregenerative and/or neuroprotective properties such as lecithin, in particular, Phosphatidylinositol, is a preferred form of lecithin because it is readily digestible by humans.

Liquid state fermentation, in accordance with the present invention, yields pure culture of fungal strain comprising morphological features that facilitates optimized inoculation of the substrate. In an embodiment, liquid state fermentation yields a spherical conglomeration of the culture of the fungal strain that is sized to interstitially penetrate the substrate thereby enabling optimized inoculation of the substrate.

In another embodiment, liquid state fermentation yields a pure culture of a fungal strain comprising spherical conglomeration with size less than 2 millimeters in diameter, which enables hyphae growth in three dimensions around the spherical conglomeration of the culture of the fungal strain.

In yet another embodiment, liquid state fermentation yields a pure culture of a fungal strain comprising spherical conglomeration with size ranging from 5 microns to 1 millimeter in diameter due to shearing of hyphae structures during a process of agitation or stirring of liquid media. Agitation and/or swirling processes can include, but not limited to, for example, mechanical shearing using magnetic stir bars, stainless steel impellers, injection of sterile high-pressure ambient air, injection at high-pressure of sterile media, and/or use of shaker tables. Higher agitation and swirling rates, in conjunction with air and media injections, produce small mycelial spheres, aliquots of which are used to inoculate solid-state agricultural substrate(s) for subsequent semi-anaerobic fermentation.

Optimally the mycelial spherical conglomerations are less than 100 microns in diameter, and more preferably, within the range of 10-50 microns in diameter.

In an embodiment, optimum growth conditions for mycelial growth can be controlled by controlling parameters such as selective pH, temperature, humidity, incubation period, media composition, aeration and pressure among such other parameters.

It is observed that oxygen inhibits anaerobic glycolysis according to the Pasteur Effect. In a further embodiment, enabling mycelial growth on an agricultural substrate can further comprise maintaining a semi-anaerobic environment in a volume of space such as a container. The container may be a jar, vat or sealed room. The semi-anaerobic environment accelerates the myceliation process of the substrate by utilizing the Pasteur Effect.

The semi-anaerobic environment can be created by depositing the substrate in an evacuated container or partially evacuated container. In a further embodiment, evacuation of oxygen or air from the container holding the substrate creates a semi-anaerobic environment. In an alternative embodiment, the container is capped to eliminate (or reduce) airflow from outside of the container.

In another embodiment an airflow regulator valve is attached to the container used for myceliation of the substrate and used to introduce a limited volume of air over time to create the semi-anaerobic environment. In another embodiment, an inert gas such as argon or helium is introduced to displace oxygen in the container to create the anaerobic environment. This regulates optimal volume of oxygen per volume of air.

The aeration, i.e. flow of air, can be regulated according to measured mycelium growth where initial conditions require a minimal amount of air flow, and air flow is increased over time. In this way an optimal rate of mycelium growth is achieved.

In another embodiment, enabling mycelial growth on an agricultural substrate further comprises mixing of liquid media by utilizing mixing methods such as agitation, stirring, swirling continuously or intermittently among such other mixing methods. Mixing of the liquid media along with shearing results in quick hyphae growth and breakdown of hyphae structures thereby forming spherical conglomerates of mycelium with size between 10 microns to 1 millimeter in diameter.

In an embodiment, a desired stage of mycelia growth can be reached, for example, when fruiting bodies begin to appear on a surface of an agricultural substrate. Mycelial growth reaching a desired stage can also be determined based on resistance offered by the liquid media against stirring or mixing of its contents. Mycelial growth reaching a desired stage can also be determined by optical analysis. In yet another embodiment, a data set using air flow numbers, temperature, pressure and other data can be used to estimate the desired stage of mycelial growth.

Agricultural substrate, pure culture of fungal strains and media contents can be carefully checked for contaminant fungal strains comprising *Rhizopus chinensis*, *R. oligosporus*, *Aspergillus flavus-oryzae*, *A tamari*, *A. niger*, *A. nidulans*, *A. sojae*, *Fusarium venenatum*, *F. graminearum*, *Saccharomyces cerevisiae*, *S. exiguus*, *S. pombe*, *Saccharomycopisis* (*Candida*) *lipolytica*, *Candida utilis*, *C. krusei* or *C. tropicalis*, *Pichia saitoi*, *Kluyveromyces fragilis*, *Endomycopsis fibuliger*, the Ascomycete *Chaetomium*, *Zygosaccharomyces rouxii*, *Mucor racemosus*, *Geotrichum candidum*, *Penicillium camemberti*, *P. notatum*, *P. griseofulvuum*, *P. grisea*, *P. chrysogenum*, *P. roqueforti*, *P. nalgiovense*, *Neurospora intermedia*, *Amylomyces rouxii*, *Endomycopsis burtonii*, *Psycilocibin*, *Monascus purpureus*, *Debaryomyces hansenii*, *Ashbya gossypii*, *Blakeslea trispora*, *Tolypocladium niveum*, *T. inflatum*, *Streptomyces*, *Neocosmospora*, *Stachybotrys*, *Beauveria*, *Cephalosporium acremonium*, *C. acremonium*, *Gibberella fujikuroi*, *Fusidium coccineum*, *Monascus rubes*; *Claviceps fusiformis*, *C. paspali*, *C. purpurea*, *Aminita muscaria*, *A. phalloides* and combinations thereof.

The present invention further pertains to methods of liquid-state and solid-state myceliation of agricultural substrates into a range of functional foods for human consumption. Agricultural substrates that are myceliated in accordance with this invention include one or more of cereals, grains, species of wheat, rye, brown rice, white rice, red rice, gold rice, wild rice, rice, barley, triticale, rice, sorghum, oats, millets, quinoa, buckwheat, fonio, amaranth, teff and durum; apples and pears, apricots, cherries, almonds, peaches, strawberries, raisins, manioc, cocoa, banana, *Rubiaceae* sp. (coffee), lemons, oranges and grapefruit; tomatoes, potatoes, peppers, eggplant, Allspice, mango powder, Angelica, Anise (*Pimpinella anisum*), Aniseed myrtle (*Syzygium anisatum*), Annatto (*Bixa orellana*), Apple mint (*Mentha suaveolens*), *Artemisia vulgaris*, Mugwort, Asafoetida (*Ferula assafoetida*), Berberis, Banana, Basil (*Ocimum basilicum*), Bay leaves, Bistort (*Persicaria bistorta*), Black cardamom, Black cumin, Blackcurrant, Black limes, Bladder wrack (*Fucus vesiculosus*), Blue Cohosh, Blue-leaved Mallee (*Eucalyptus polybractea*), Bog Labrador Tea (*Rhododendron groenlandicum*), Boldo (*Peumus boldus*), Bolivian Coriander (*Porophyllum ruderale*), Borage (*Borago officinalis*), Calamus, Calendula, Calumba (*Jateorhiza calumba*), Chamomile, Cannabis, Caper (*Capparis spinosa*), Caraway, Cardamom, Carob Pod, Cassia, Casuarina, Catnip, Cat's Claw, Catsear, Cayenne pepper, Celastrus Paniculatus, Comfrey, Celery salt, Celery seed, Centaury, Chervil (*Anthriscus cerefolium*), Chickweed, Chicory, Chile pepper, Chili powder, Cinchona, Chives (*Allium schoenoprasum*), Cicely (*Myrrhis odorata*), Cilantro (see Coriander) (*Coriandrum sativum*), Cinnamon (and Cassia), Cinnamon Myrtle (*Backhousia myrtifolia), Clary, Cleavers, Clover, Cloves, Coltsfoot, Comfrey, Common Rue, Condurango, Coptis, Coriander, Costmary (*Tanacetum balsamita*), Couchgrass, Cow Parsley (*Anthriscus sylvestris*), Cowslip, Cramp Bark (*Viburnum opulus*), Cress, Cuban Oregano (*Plectranthus amboinicus*), Cudweed, Cumin, Curry leaf (*Murraya koenigii*), Damiana (*Turnera aphrodisiaca*), Dandelion (*Taraxacum officinale*), Demulcent, Devil's claw (*Harpagophytum procumbens*), Dill seed, Dill (*Anethum graveolens*), Dorrigo Pepper (*Tasmannia stipitata*), Echinacea, Echinopanax Elatum, Edelweiss, Elderberry, Elderflower, Elecampane, *Eleutherococcus senticosus*, Epazote (*Chenopodium ambrosioides*), Ephedra, Eryngium foetidum, *Eucalyptus*, Fennel (*Foeniculum vulgare*), Fenugreek, Feverfew, Figwort, Five-spice powder (Chinese), Fo-ti-tieng, Fumitory, Galangal, Garam masala, Garden cress, Garlic chives, Garlic, Ginger (*Zingiber officinale*), Ginkgo biloba, Ginseng, Ginseng, Siberian (*Eleutherococcus senticosus*), Goat's Rue (*Galega officinalis*), Goada masala, Golden Rod, Golden Seal, Gotu Kola, Grains of paradise (*Aframomum melegueta*), Grains of Selim (*Xylopia aethiopica*), Grape seed extract, Green tea, Ground Ivy, Guaco, Gypsywort, Hawthorn (*Crataegus sanguines*), Hawthorne Tree, Hemp, Herbes de Provence, Hibiscus, Holly, Holy Thistle, Hops, Horehound, Horseradish, Horsetail (*Equisetum telmateia*), Hyssop (*Hyssopus officinalis*), Jalap, Jasmine, Jiaogulan (*Gynostemma pentaphyllum*), Joe Pye weed (Gravelroot), John the Conqueror, Juniper, Kaffir Lime Leaves (*Citrus hystrix, C. papedia*), Kaala masala, Knotweed, Kokam, Labrador tea, Lady's Bedstraw, Lady's Mantle, Land cress, Lavender (*Lavandula* spp.), Ledum, Lemon Balm (*Melissa Officinalis*), Lemon basil, Lemongrass (*Cymbopogon citratus, C. flexuosus*, and other species), Lemon Ironbark (*Eucalyptus staigeriana*), Lemon mint, Lemon Myrtle (*Backhousia citriodora*), Lemon Thyme, Lemon verbena (*Lippia citriodora*), Licorice—adaptogen, Lime Flower, Limnophila aromatica, Lingzhi, Linseed, Liquorice, Long pepper, Lovage (*Levisticum officinale*), Luohanguo, Mace, Mahlab, Malabathrum, Manchurian Thorn Tree (*Aralia manchurica*), Mandrake, Marjoram (*Origanum majorana*), Marrubium vulgare, Marsh Labrador Tea, Marshmallow, Mastic, Meadowsweet, Mei Yen, Melegueta pepper (*Aframomum melegueta*), Mint, Milk thistle (*Silybum*), Bergamot (*Monarda didyma*), Motherwort, Mountain Skullcap, Mullein (*Verbascum thapsus*), Mustard, Mustard seed, Nashia inaguensis, Neem, Nepeta, Nettle, Nigella sativa, Kolanji, Black caraway, Noni, Nutmeg, Mace, Marijuana, Oenothera (*Oenothera biennis*), Olida (*Eucalyptus olida*), Oregano (*Origanum vulgare, O. heracleoticum*), Orris root, Osmorhiza, Olive Leaf (used in tea and as herbal supplement), *Panax quinquefolius*, Pandan leaf, Paprika, Parsley (*Petroselinum crispum*), Passion Flower, Patchouli, Pennyroyal, Pepper (black, white, and green), Peppermint, Peppermint Gum (*Eucalyptus dives*), Perilla, Plantain, Pomegranate, Ponch phoran, Poppy seed, Primrose (Primula), candied flowers, dry tea mixes, Psyllium, Purslane, Quassia, Quatre epices, Ramsons, Raspberry (leaves), Reishi, Restharrow, Rhodiola rosea, Riberry (*Syzygium luehmannii*), Rocket/Arugula, Roman chamomile, Rooibos, Rosehips, Rosemary (*Rosmarinus officinalis*), Rowan Berries, Rue, Safflower, Saffron, Sage (*Salvia officinalis*), Saigon Cinnamon, St John's Wort, Salad Burnet (*Sanguisorba minor* or *Poterium sanguisorba*), Salvia, Sichuan Pepper (Sansho), Sassafras, Savory (*Satureja hortensis, S. Montana*), Schisandra (*Schisandra chinensis*), Scutellaria costaricana, Senna (herb), *Senna obtusifolia*, Sesame seed, Sheep Sorrel, Shepherd's Purse, Sialagogue, Siberian Chaga, Siberian ginseng (*Eleutherococcus senticosus*), Siraitia grosvenorii (luohanguo), Skullcap, Sloe Berries, Smudge Stick, Sonchus, Sorrel (*Rumex* spp.), Southernwood, Spearmint, Speedwell, Squill, Star anise, Stevia, Strawberry Leaves, Suma (*Pfaffia paniculata*), Sumac, Summer savory, *Sutherlandia frutescens*, Sweet grass, Sweet cicely (*Myrrhis odorata*), Sweet woodruff, Szechuan pepper (*Xanthoxylum piperitum*), Tacamahac, Tamarind, Tandoori masala, Tansy, Tarragon (*Artemisia dracunculus*), Tea, *Teucrium polium*, That basil, Thistle, Thyme, Toor Dall, Tormentil, Tribulus terrestris, Tulsi (*Ocimum tenuiflorum*), Turmeric (*Curcuma longa*), Uva Ursi also known as Bearberry, Vanilla (*Vanilla planifolia*), Vasaka, Vervain, Vetiver, Vietnamese Coriander (*Persicaria odorata*), Wasabi (*Wasabia japonica*), Watercress, Wattleseed, Wild ginger, Wild Lettuce, Wild thyme, Winter savory, Witch Hazel, Wolfberry, Wood Avens, Wood Betony, Woodruff, Wormwood, Yarrow, Yerba Buena, Yohimbe, Za'atar, Zedoary Root, or derivations thereof in aqueous or semi-aqueous solution.

In one embodiment, functional foods produced from myceliated agricultural substrates according to the present invention comprise of tempeh-style myceliated grains, foods made from myceliated flour, libations brewed from myceliated coffee beans, powders made from myceliated green cocoa beans, myceliated vanilla beans, and myceliated gourmet foods.

In an embodiment, present invention also provides a method of myceliation of agricultural substrates for producing functional foods with neuroregenerative properties, wherein inoculation of agricultural substrate is carried out using pure culture of *Hericium erinaceus* and *Tremella fuciformis*. Neuroregenerative properties of both the species are known in the art. Moreover, it is also known in the art that mycelial structures of *H. erinaceus* showed presence of bioactive compounds with improved neuroregenerative effects than the compounds present in the fruiting bodies of *H. erinaceus*.

In an embodiment, present invention provides a method of myceliation of agricultural substrates for producing functional foods with neuroprotective properties, wherein pre-processing of the agricultural substrate by at least partial coating of a surface of the substrate with lecithin may enhance neuroprotective properties of the myceliated agricultural product.

Nutriceuticals can be formulated from either the broth of submerged or stationary liquid tissue culture or from a blended mycelial culture of agricultural substrate in water. While using liquid tissue broth to create mushroom concentrates for formulation may be more cost effective than using blended cultures grown on substrate, mature cultures grown on substrate (i.e. grain) will include fruit body tissue, primordial tissue, and spores, encompassing all four stages of the mushroom's life cycle. Given that some metabolites are exclusive to certain tissue (such as in *Hericium erinaceous*, where erinacenes are found in the mycelium and hericenones are found in the fruit body, or in *Ganoderma lucidum*, where polysaccharides are more diverse in the mycelium but the fruit body contains a greater triterpenoid content), formulating nutriceuticals from mature myceliated substrate cultures provides more health-benefits than from concentrated liquid tissue culture broth.

In an embodiment, myceliated agricultural substrate comprises of bioactive compounds such as polysaccharides, glucan, sterols, fatty acids, phenol, triterpenes, proteins, amino acids, glycoproteins, vitamins, mineral salts and its combinations thereof.

In an embodiment, myceliated agricultural products comprises of health benefit properties such as anti-aging, anti-tumor, anti-bacterial, anti-fungal, anti-viral activity, cholesterol regulation, neuroprotection, anti-oxidant, immunomodulation and hepatoprotective properties.

In an embodiment, myceliated agricultural products are subjected to processing in order to produce functional foods, wherein the processing comprises of mashing, pressing, boiling, frying, baking, boiling, roasting, toasting and its combinations thereof. For example, coffee beans, vanilla beans, or cocoa beans can undergo solid state myceliation in accordance with the present invention following by baking, toasting or roasting as per conventional methods can produce functional foods with much more health care benefits as compared to those of the original substrates.

The delivery method presented herein may be preferable to consumers of nutraceuticals and functional foods. The dietary supplements and medications are generally available to be taken as pills or injections on a routine basis. The functional foods of the present invention, including but not limited to, for example, tempeh-style myceliated grain, egg noodles from myceliated flour, libations brewed from myceliated coffee beans, and chocolate or vanilla confections and powders made from myceliated green cocoa or myceliated green vanilla beans may provide a more pleasing delivery system than other related art.

Consumers are concerned about glycemic index of foods as chronically high blood sugar leads to many health complications such as diabetes and related metabolic disorders. The present invention can provide functional foods, which are hypoglycemic. For example, certain strains such as *Cordyceps sinensis* and *Ganoderma lucidum* contain polysaccharides that are hypoglycemic. After fermentation and processing, tempeh-style products made from rice in accordance with the present invention have a higher percentage of protein and a lower percentage of carbohydrate than original substrate. The glycemic index of the substrate is improved by myceliation, through the conversion of some substrate carbohydrates into myco-protein, and thorough the introduction of hypoglycemic polysaccharides that result from the myceliation process.

Furthermore, the present invention does not utilize or require common anti-caking agents such as gypsum, which are not suitable or desirable in human food products. On the other hand, the present invention utilizes anti-caking agents such as olive oil and lecithin to further reduce glycemic index of these tempeh-style products, increase interstitial space in substrate for more efficient floating and submerged liquid-state culture inoculation, and to provide extra nutrition to the Fungi. In one exemplary embodiment, 1 mL to 10 mL olive oil containing 1% to 10% (w/v) dissolved lecithin, per 1 lb to 4 lb of brown rice, grains, and seed is used.

Coffee brewed from roasted myceliated green coffee beans, in accordance with the present invention, lack compounds that make coffee bitter because the myceliation process consumes many of these compounds. Myceliated coffee can make less bitter coffee that is lower in caffeine content than unmyceliated substrate.

In a further embodiment, using myceliation methods as disclosed herein, agricultural substrates myceliated with *Agaricus Blazei, Cordyceps sinensis, Ganoderma lucidum, Hericium erinaceus, Grifola frondosa, Pleurotus eryngii, P. ostreatus, P. citrinopileatus, P. djamor, Trametes versicolor, Lentinula edodes, Flammulina velutipes, Volvariella volvacea, Hypsizygus marmoreus, Pholiota nameko, Tuber melanosporum, Lentinus edodes, Moschella hortensis, Polyporus umbellatus*, and *Tremella fuciformis* can be deep-frozen for later use after fermentation in either small-scale or large-scale solid-state production, wherein a fermented product can then be cooked, fried, boiled, mashed, pressed, baked, toasted, roasted, or blanched in aqueous and/or oil-based solution after completion of the fermentation. Products may be used directly, and/or reformulated into value-added delicious functional foods. Products can be packaged into tempeh-form meat substitutes such as sausages, burger patties, filets, ground meat, jerky, egg noodles, and sauces.

In another exemplary embodiment, *Tremella fuciformus, Pholiota nameko, Flammulina velutipes*, or *Ganoderma lucidum* can be used to myceliate raw flax seed and or chia seed such that when prepared, fermented, and formulated as described herein, produces extraordinarily slippery jelly which when filtered and purified has commercial, home and clinical application including phenomena such as enhancing digestion, or lubrication of mucus membranes.

In one embodiment, the present invention can also provide a method for using *Ganoderma lucidum, Pleurotus* and/or *Cordyceps sinensis* to produce myceliated grain and/or other myceliated materials, and as a potency, flavor, texture, smell and color enhancer in aproduction of nutriceutical formulations and functional foods.

The present invention can be used in producing "Truffle-Oil", oil-based extracts of Truffle cultures useful for salad dressings, gourmet cooking and food processing. These products may attract consumers who wish to derive general immunomodulating, anti-aging, aphrodisiac, anti-tumour, anti-viral, anti-bacterial, and/or anti-fungal properties, activities, and benefits, by orally consuming substrate which has been converted to edible presentations of a- and b-glucans, glycoproteins, proteins, ergosterols, sterols, triterpenes, and fatty acids in the form of nutriceuticals and functional foods.

In one embodiment, the present invention also uses golden strains of *Moschella* which can ferment an agricultural substrate analogous to taste, smell, flavor and texture of honey, producing an effective substitute for sugar in some recipes.

In another embodiment, the present invention can use Matsutake mycelium to produce stand alone mycellated grain, as a potency, flavor, texture, smell and/or color enhancer analogous to spice cinnamon (*Cinnamomum zeylanicum*).

In a yet another embodiment, in making delicious fish-meat substitutes, the present invention can use *H. erinaceus* and strains of *Pleurotus* to produce fish-meat analogues of similar texture, taste and flavor to crab, lobster, and fish, both freshwater and saltwater. These products may attract consumers who wish to avoid gout and or to derive the general immunomodulating, anti-tumor, aphrodisiac, anti-tumour, anti-viral, anti-bacterial, and/or anti-fungal properties, activities, and benefits, by orally consuming substrate which has been converted to edible presentations of a- and b-glucans, glycoproteins, proteins, ergosterols, sterols, triterpenes, and fatty acids in the form of nutriceuticals and functional foods.

Myceliation method of the present invention can also be used to ferment herbs such as comfrey, calendula, chickweed, plantain, lavender, goldenseal, for oral, topical and/or other nutraceutical and functional food application to increase potency in downstream formulations such as value-added soaps, salves, and syrups.

While the preferred embodiments of the invention have been described above, it will be recognized and understood that various modifications may be made therein, and the appended claims are intended to cover all such modifications which may fall within the spirit and scope of the invention.

In the following, the present invention is described in more detail by way of examples. However, these examples are not intended to limit the scope of protection of the present invention in any way.

EXAMPLES

Example 1

Growth of Fungal Culture

Pure strains of selected fungal cultures are obtained from referenced collections and manipulated in sterile environments at 68 degrees F. to 90 degrees F., in 1 gal to 10 gal plastic bags, 1 qt to 1 gal glass jar, or on 10 cm to 15 cm Petri plates, using undefined, organic fruit and vegetable-based media with 1.5% agar (w/v), in order to monitor and ensure the general vigor and health of strains. Mycelial samples are grown in a gentle, ambient sterile airflow for 2 to 4 weeks, then excised from Petri plates and subsequently used for inoculation into liquid-state fermentation employing a similar undefined fruit and vegetable-based media, using ambient air, in 1 qt to 1 gal glass jars, with agitated or unagitated cultures in stainless steel tanks which have been designed for commercial fermentation. Unagitated liquid-state fermentation forms a floating mass of hyphae which exhibits continuous growth at an interface of liquid and air. The mycelium of agitated and/or swirling cultures grows very quickly as hyphal spheres, which being hydrated, remain submerged, and have the appearance of gelatinous beads in small diameter. Hydrated hyphael spheres collapse upon desiccation, making them useful in inoculating petri-plates for strain propagation and quality control. Sphere diameter in liquid-state fermentation is inversely proportional to agitation intensity and volume. Hyphal shear becomes more efficient at higher agitation and swirling intensity, and once sheared, hyphae form new spheres of smallest possible diameter, growing in size until they shear again. When employed in continuous liquid-state fermentation, there exists a constant ratio of sphere diameters, and therefore a constant supply of spheres on the order of microns. The hyphal sphere diameter is adjusted to optimally inoculate various substrate materials. For rice, the ideal hyphal sphere diameter is from 10-50 microns in diameter.

Example 2

Pre-Processing of Substrate

Agricultural substrates are subjected to heat treatment based on the nature of the substrate. Substrates that may require sterilization such as unprocessed fruits, vegetables, cereal grains, culinary seeds are subjected to heat treatment by pressure cooking for 90 minutes at 15 lb/in2 and then cooled to room temperature prior to inoculation by liquid-state culture. Whereas, the agricultural substrates that are not able to withstand high sterilization temperature, such as culinary spices, medicinal herbs, natural flavorings, tea mixes, green vanilla beans, green cocoa beans, and/or green coffee beans are subjected to pasteurization treatment. Pasteurization of agricultural substrate is achieved by placing the substrate in 1 qt to 1 gal glass jars, or as 1 lb to 8 lb aliquots in plastic growth bags made for growing Fungi with an appropriate breather patch, and subjecting the agricultural substrate to dry heat treatment for 30 min to 90 minutes in covered stainless steel trays using ambient air heated at 145 degrees F. to 195 degrees F. The pasteurized agricultural substrates are cooled to room temperature and made ready for inoculation.

Example 3

Inoculation of Agricultural Substrates with Pure Strains of Fungal Culture

In an unagitated liquid state fermentation, after commanding the liquid-state medium for a growth period of 2 to 4 weeks, cultures form a floating mass of hyphae, which are gently blended with a sharp, sterile cutting device prior to inoculation, are used for inoculation. Gentle blending is achieved by mixing or low homogenization in a commercial blender in short bursts at slow speeds. Aliquots of blended liquid-state culture are used to inoculate sterilized unprocessed fruits and or vegetables, cereal grains, and/or culinary seed, or pasteurized culinary spice, medicinal herbs, natural flavorings, tea mixes, green vanilla beans, green cocoa beans, and/or green coffee beans.

Example 4

Small Batch Fermentation

Pure cultures of selected fungal strains are grown semi-aerobically and inoculated into 1 qt to 1 gal glass jars, or into 1 gal to 5 gal autoclavable plastic bags containing pre-processed agricultural substrates such as fruit, vegetables, herbs, spices, teas, green vanilla beans, green cocoa beans, green coffee beans; incubated at temperature between 70 degrees F. to 90 degrees F. depending upon the fungal strain and the agricultural substrate. Cultures in jars or bags are gently mixed every few days until they command the substrate and eventually the contents becomes resistant to mixing or shaking, usually 2 to 4 weeks depending upon strain, followed by harvesting and processing of the myceliated agricultural product for small-scale production of functional food products sold in a tempeh form.

Example 5

Other Exemplary Functional Foods

Myceliated green vanilla beans are cooked or baked, the myceliated green cocoa beans are bake or toasted, and the myceliated green coffee beans are toasted or roasted. Myceliated grain presented in tempeh form, or as an ingredient in food(s) including soups, stir frys, breads, and meat-substitutes, is made safe to eat, and bio-available, by cooking on low to medium heat, 145 degrees F. to 165 degrees F., for 10 min to 60 min, at some point prior to consumption. Other cultures in jars or bags, such as herbs and spices can be dried at 100 degrees F. to 145 degrees F. for 1 h to 24 h, packaged and used conventionally to enjoy the benefits of this invention.

Myceliated honey formulations are stirred for 10 min to 90 min at 100 degrees F. to 125 degrees F., then poured into small glass bottles and sold as a variety of products including: "Reishi Honey", "Lions Mane Honey", "Cordyceps Honey", "Shiitake Honey", "Maitake Honey", "Turkey-Tail Honey", "Enokitake Honey", "Oyster Mushroom Honey" and "Reishi-Cordyceps Honey". Similarly myceliated coffee beans can be sold as "Reishi Coffee", "Reishi Coffee Honey", "Reishi Chocolate", "Reishi Chocolate Honey", "Reishi Vanilla" and "Reishi Vanilla Honey". Moreover, myceliated agricultural products can also be reformulated into value-added products including "Lions Mane Egg Noodles", "Reishi Egg Noodles", "Shiitake Egg Noodles", etc, for use in a wide variety of nutrition enriched, biologically-active functional food forms.

In addition to the myceliated agricultural products, fermented media contents can also be used for preparing gourmet foods such as tempeh style meat substitutes, specialty flavorings, cooking sauces, ingredient in soup and other recipes.

Example 6

Large Batch Fermentation

For a large batch liquid-state and solid-state operation, pure cultures are grown aerobically and inoculated into large industrial liquid-state and large solid-state commercial processors operated continuously and semi-anaerobically for large-scale fermentation of food products. After cultures of media turn completely white or a representative color thereof for a particular species, and have completely overgrown and commanded the medium and are resistant to gentle mixing, the contents are harvested, removed to plastic bags and refrigerated for quick use at either 40 degrees F., or frozen for long-term storage, and subsequent utilization, at −20 degrees F. Fermented media are prepared into gourmet human foods including: "tempeh style" meat substitutes, egg-noodles, specialty flavorings, breads, extracts and cooking-sauces, or used directly as a fresh ingredient in soup and/or stir fried recipes; or packaged for delivery and sales.

What is claimed is:

1. A method of myceliation of green cocoa beans to prepare myceliated cocoa beans, consisting of the steps of:
   providing sterilized green cocoa beans;
   inoculating the cocoa beans with a pure culture consisting of a liquid fungal culture, wherein the inoculating is performed under sterile conditions;
   culturing the fungal culture together with the sterilized cocoa beans to produce myceliated cocoa beans, wherein the culturing is performed under sterile conditions;
   harvesting the myceliated cocoa beans after mycelial growth reaches a desired growth stage; and
   roasting the myceliated cocoa beans, wherein the roasted myceliated cocoa beans are capable of being used as a palatable food product for humans, and wherein the fungal culture is selected from the group consisting of *Hericium erinaceus, Tremella fuciformis, Agaricus blazei, Cordyceps sinensis, Flammulina velutipes, Ganoderma lucidum, Grifola frondosa, Letinula edodes, Phellenis linteus, Polyporus umbellatus, Inonotus obliquus, Pleurotus ostreatus, P. eryngii, P. citrinopileatus, P. djamor, Trametes versicolor, Volvariella volvacea, Hypsizygus marmoreus, Pholiota nameko, Moschella hortensis*, Matsutake, and combinations thereof.

2. The method of claim 1, wherein the fungal culture is a stationary liquid fungal culture creating an environment that enhances direct mycelial growth downward from a floating mass into the liquid media.

3. The method of claim 1, wherein the fungal culture is a submerged fungal culture.

4. The method of claim 1, further comprising processing the harvested myceliated cocoa bean product into a food for human consumption comprising the steps of one or more of mashing, pressing, boiling, frying, baking, boiling, roasting, and/or toasting.

5. The method of claim 1, wherein the fungal culture is *G. lucidum*.

6. The method of claim 1, wherein the fungal culture is *C. sinensis*.

7. The method of claim 1, wherein the fungal culture is *Inonotus obliquus*.

8. The method of claim 1, wherein the fungal culture is *Grifola frondosa*.

9. The method of claim 1, wherein the fungal culture is *Hericium erinaceus*.

* * * * *